(12) United States Patent
Tesner

(10) Patent No.: US 9,333,453 B2
(45) Date of Patent: May 10, 2016

(54) EXTERNAL AIR FILTER FOR VEHICLE TRANSMISSIONS AND THE LIKE

(71) Applicant: GM Global Technology Operations LLC, Detroit, MI (US)

(72) Inventor: Kenneth C. Tesner, Farmington Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 106 days.

(21) Appl. No.: 14/077,796

(22) Filed: Nov. 12, 2013

(65) Prior Publication Data

US 2015/0128806 A1 May 14, 2015

(51) Int. Cl.
*B01D 53/02* (2006.01)
*B01D 53/04* (2006.01)
*F01N 3/08* (2006.01)

(52) U.S. Cl.
CPC .............. *B01D 53/04* (2013.01); *F01N 3/0835* (2013.01); *B01D 2253/102* (2013.01); *B01D 2257/90* (2013.01); *B01D 2259/4566* (2013.01)

(58) Field of Classification Search
CPC .............................. B60H 3/06; B01D 2279/50
See application file for complete search history.

(56) References Cited

U.S. PATENT DOCUMENTS

| | | | | |
|---|---|---|---|---|
| 3,746,169 | A * | 7/1973 | Willinger et al. | 210/87 |
| 6,136,189 | A * | 10/2000 | Smith et al. | 210/266 |
| 6,217,639 | B1 * | 4/2001 | Jackson | B01D 53/0415 55/385.4 |
| 2011/0173935 | A1 * | 7/2011 | Tesner et al. | 55/385.3 |
| 2012/0199002 | A1 * | 8/2012 | Amann | 95/273 |

* cited by examiner

*Primary Examiner* — Christopher P Jones

(57) ABSTRACT

An air filter comprises a rigid, hollow body that may be spherical, cylindrical, rectangular or shaped to conform to available, typically underhood, space. If spherical, it may be assembled from a first, lower hemisphere and a second, upper hemisphere which are secured together about their edges, by, for example a press or interference fit, an O-ring received within complementary, edge adjacent channels, an adhesive or autogenous bonding. Other shapes and configurations may be assembled from a body with, for example, a solid bottom and attachable lid, top or cover. The hollow body is filled with activated carbon filter media or passive fibrous filter media. The upper hemisphere, lid or cover includes an outlet and cap which reduces the possibility of ingesting water into the filter. The lower hemisphere or body includes an inlet fitting to which a hose leading to an outlet or vent in the powertrain component is attached.

17 Claims, 2 Drawing Sheets

EXTERNAL AIR FILTER FOR VEHICLE TRANSMISSIONS AND THE LIKE

FIELD

The present disclosure relates to air filters for motor vehicles and more particularly to filters for removing odors from air escaping from transmissions, transfer cases, differentials and the like in motor vehicles.

BACKGROUND

The statements in this section merely provide background information related to the present disclosure and may or may not constitute prior art.

It is not news that with the nearly universal incorporation of air conditioning systems into passenger cars, they are operated as essentially sealed compartments with the sole source of air being the heating, ventilating and air conditioning (HVAC) system. This situation places a premium on the supply of clean, fresh smelling air to the passenger compartment, free of any odors, at least from the driver's own vehicle.

The increasingly sophisticated compositions of low viscosity oils, transmission fluids and gear lubricants has been accompanied by a curiously expanding palette of odors from such materials. A consequence thereof are a small number of customer complaints of unpleasant odors. While containing such fluids and odors by sealing transmissions and other powertrain components would appear to prevent such odors from entering the HVAC system, this is often not possible as most transmissions and other powertrain components require an open air vent to maintain pressure neutrality. With such air vents, there is typically a relatively high volume of air exchanged from the transmission to the ambient.

The present invention addresses and solves the problem of dispersion of lubricating fluid odors and their ingestion into the HVAC system and passenger compartment of a motor vehicle.

SUMMARY

The present invention provides an air filter which removes odors from air escaping from powertrain components of a motor vehicle. The powertrain component may be, for example, either an automatic or manual transmission, a transfer case or a differential, to name four principal devices with which the air filter may be utilized. The air filter comprises a rigid, hollow body that may be spherical, cylindrical, rectangular or shaped to conform to available, typically underhood, space. If spherical, it may be assembled from a first, lower hemisphere and a second, upper hemisphere which are secured together about their edges, by, for example a press or interference fit, an O-ring received within complementary, edge adjacent channels, an adhesive or autogenous bonding. Other shapes and configurations may be assembled from a body with, for example, a solid bottom and attachable lid, top or cover. The hollow body is filled with an odor absorbing material such as activated carbon (charcoal) filter media, non-woven fabric impregnated with activated carbon or passive fibrous filter media. The upper hemisphere, lid or cover includes an outlet and vent cap which reduces the possibility of ingesting water into the filter. The lower hemisphere or body includes an inlet fitting such as a barbed fitting to which a hose leading to an outlet or vent in the powertrain component is attached.

Thus it is an aspect of the present invention to provide a filter for absorbing odors from motor vehicle powertrain components.

It is a further aspect of the present invention to provide an air filter for absorbing odors from powertrain components such as transmissions, transfer cases and differentials of motor vehicles.

It is a still further aspect of the present invention to provide an air filter having a hollow body, a vent cap assembly on an upper portion of the body and an inlet fitting on its lower portion.

It is a still further aspect of the present invention to provide an air filter having a hollow body which is filled with odor absorbing media such as activated carbon or passive media such as filtration material.

It is a still further aspect of the present invention to provide an air filter having a spherical body comprised of a first, lower hemisphere and a second, upper hemisphere which are secured together.

It is a still further aspect of the present invention to provide an air filter having a spherical body comprised of a first, lower hemisphere, a second, upper hemisphere which are secured together and filter media disposed in the spherical body.

It is a still further aspect of the present invention to provide an air filter having a hollow body comprised of a first, lower portion or bottom and a second, upper portion or top which are secured together.

It is a still further aspect of the present invention to provide an air filter having a hollow body comprised of a first, lower portion or bottom, a second, upper portion or top which are secured together and filter media disposed in the hollow body.

Further advantages, aspects and areas of applicability of the invention will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
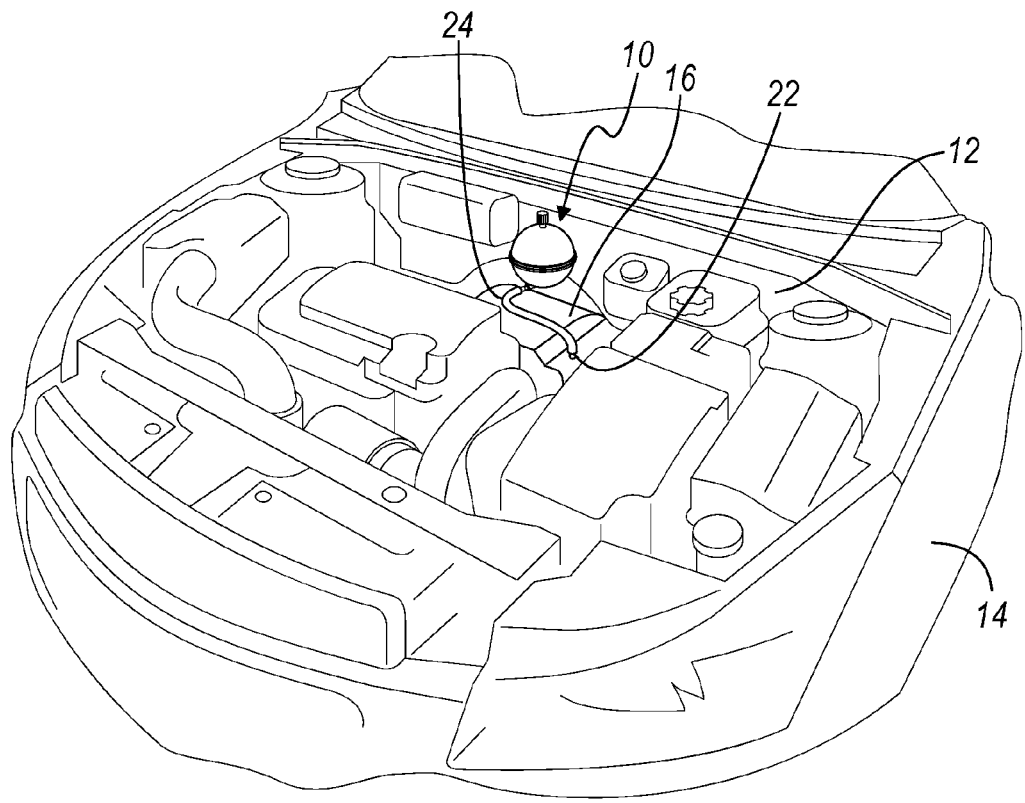
FIG. 1 is a perspective view of an air filter assembly according to the present invention disposed on a firewall of a motor vehicle adjacent and above a transmission to which it is connected.

With reference to FIG. 1, an air filter assembly according to the present invention is illustrated and generally designated by the reference number 10. The air filter assembly 10 is illustrated mounted on a firewall 12 of a motor vehicle 14 such as, for example, a passenger car, a sport utility vehicle or a light truck. The motor vehicle 14 includes a transmission 16, which may be manual or automatic, and which includes an outlet or vent port or fitting 22 which generally and preferably is located on the top or upper portion of the transmission 16. A flexible hose or tube 24 communicates between the outlet or vent port 22 of the transmission (and thus the interior of the transmission 16) and the air filter assembly 10, It will be appreciated that the air filter assembly 10 according to the present inventions is useable, and is intended to be used, with all vented motor vehicle powertrain components containing lubricants capable of generating odors such as transmissions, as stated above, and also transfer cases, differentials and other, similar components.

Figure 2:
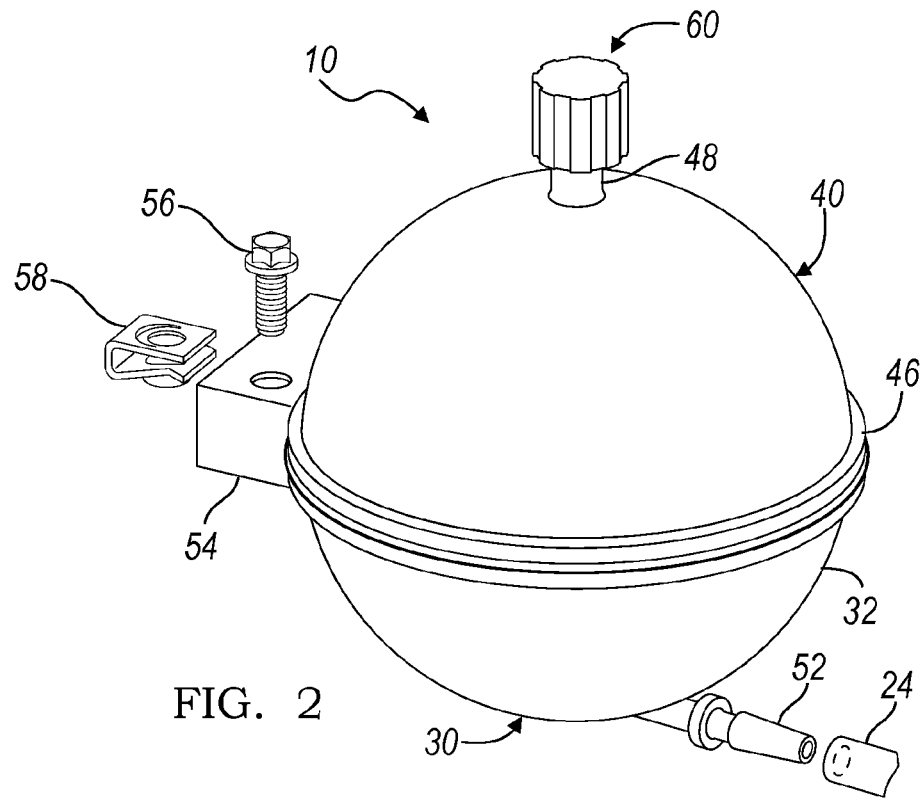
FIG. 2 is an enlarged, perspective view of an air filter assembly according to the present invention.
Figure 3:
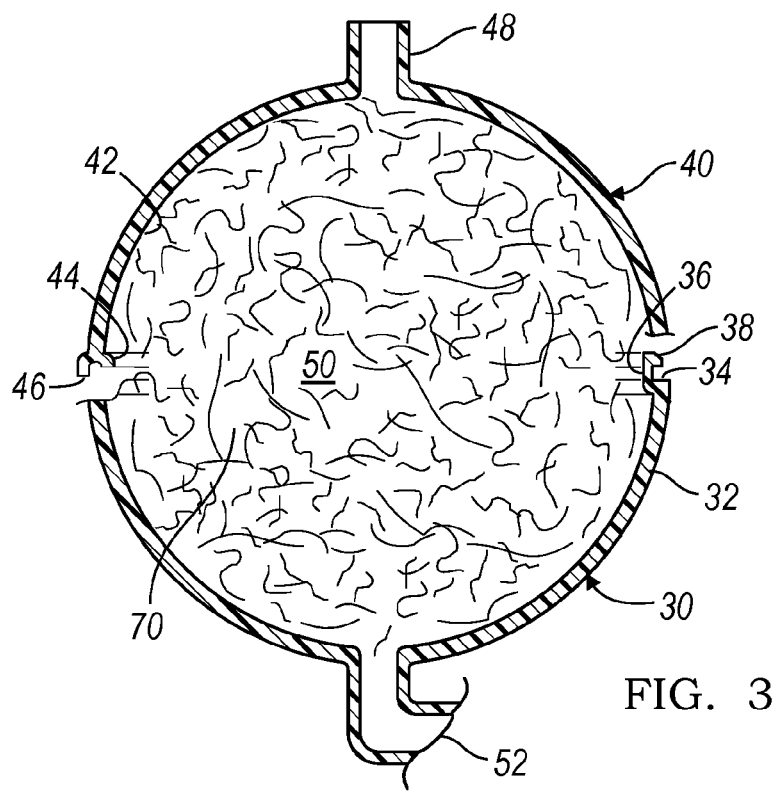
FIG. 3 is a full, sectional view of an air filter assembly according to the present invention.

Referring now to FIGS. 2 and 3, the air filter assembly 10 includes a first, lower hemisphere, portion or body 30 and a second, upper hemisphere, portion or body 40. It will be appreciated, however, that the air filter assembly 10 according to the present invention may define other shapes such as cylindrical, oval, square, rectangular, pyramidial, polygonal, or simply irregular, taking on, for example, the shape of a particular space under the hood or adjacent the rear axle within which the air filter assembly may be located. Regardless of the shape, the air filter assembly will still typically include a first, lower portion or body 30 and a second, upper portion 40 or top, lid or cover which may be secured, in air-tight or substantially air-tight fashion to the lower portion or body 30.

Preferably, the lower portion 30 and the upper portion 40 are assembled by an interference or snap fit. As such, the lower portion 30 defines an outer surface 32 which includes an inwardly extending, channel or groove 34 adjacent its upper edge 36 and extending about its periphery which is illustrated on the right side of FIG. 3. An inner surface 42 of the upper portion 40 includes an inwardly directed complementary rib, lip, flange or projection 44 adjacent its lower edge 46 which extends therearound and is illustrated in the left side of FIG. 3. The upper portion 40 also includes or defines an outlet fitting or nipple 48 at or near its top or uppermost feature. To facilitate snap together assembly of the lower and upper portions 30 and 40, an oblique or chamfered surface 38 defines a region adjacent the upper edge 36 of the lower portion 30.

It will be appreciated that the above described assembly features may be disposed on the opposite portions, that is, the rib, lip or projection 44 on the upper portion 40 may be located on the lower portion 30 and the groove 34 and the oblique surface 38 on the lower portion 30 may be located on the upper portion 40. Furthermore, assembly and securement may be achieved by incorporating two channels or grooves which align when the portions 30 and 40 are assembled and which cooperatively receive and retain an O-ring or other cross section resilient seal. Finally, the portions 30 and 40 may simply include opposing and overlapping complementary surfaces which are secured together by, for example, an adhesive or autogenous bonding.

When assembled, the lower portion 30 and the upper portion 40 define a hollow, interior space 50. The outlet fitting or nipple 48 of the second, upper portion 40 of the assembly 10 provides communication between the ambient and the hollow, interior space 50 and an inlet fitting 52 provides communication between the hollow, interior space 50 of the first, lower portion 30 of the assembly 10. The inlet fitting 52 which is preferably a barbed fitting or similarly configured fitting receives the flexible hose or tubing 24 which communicates with the outlet or vent port or fitting 22 on the upper portion of the transmission 16. To facilitate mounting to the firewall 12 or other surface, panel or feature of the motor vehicle 14, the first, lower portion 30 of the air filter assembly 10 preferably includes a formed or cast bracket 54 which engages or is engaged by a complementary feature on the motor vehicle 14.

A fastener 56, such as a bolt or machine screw and a complementary fastener such as a speed nut 58, may be utilized to secure the air filter assembly 10 to the motor vehicle 14.

Figure 4:
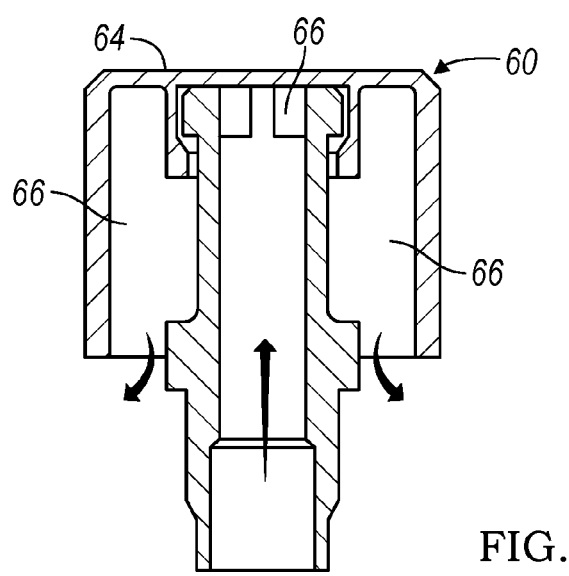
FIG. 4 is an enlarged, sectional view of a vent cap utilized on an air filter assembly according to the present invention.

Referring now to FIG. 4, the outlet fitting or nipple 48 receives a water deflecting cap or cover 60. The cap or cover 60 is preferably a press fit on the outlet fitting or nipple 48 and, as such, may include a latch or similar structure that ensures retention of the cap or cover 60 on the outlet fitting 48. The cap or cover 60 includes a solid top or upper portion 64 which deflects water and substantially prevents ingestion of same into the interior 50 of the air filter assembly 10. The cap or cover 60 defines radial and axial passageways 66 which provide communication between the hollow interior 50 of the air filter assembly 10, through the outlet fitting 48, between the exterior of the outlet fitting 48 and the interior walls of the cap or cover 60 and to the ambient. The unnumbered arrows generally indicate the direction of air flow through the cap or cover 60.

Referring again to FIG. 3, the hollow interior space 50 of the air filter assembly 10 is filled with odor absorbing filter media 70 that absorbs and traps volatized lubricants from, for example, transmissions, transfer cases, differentials and other powertrain components. The filter media 70 may be active material such as activated carbon, also known as activated charcoal or activated coal, non-woven, for example, polyester fabric impregnated with activated carbon filtration material or similar materials or, less desirably, may be passive materials such as fiberglass strands, layers of filtration fabric, paper filtration media or similar odor blocking or absorbing materials. It will be appreciated that reversible assembly configurations, that is, configurations that allow dis-assembly and re-assembly, such as a snap or interference fit or assembly achieved by incorporation of a resilient (e.g., O-ring) seal facilitate rapid and straightforward replacement of the filter media 70 should this become necessary.

Thus it will be appreciated that the air filter assembly 10 of the present invention provides for the absorption of volatized lubricants from motor vehicle transmissions, transfer cases, differentials and other powertrain components while allowing them to be vented to the ambient thereby maintaining the pressure neutrality of such components.

The description of the invention is merely exemplary in nature and variations that do not depart from the gist of the invention are intended to be within the scope of the invention. Such variations are not to be regarded as a departure from the spirit and scope of the invention.

What is claimed is:

1. An apparatus for absorbing a volatized lubricant from motor vehicle components comprising, in combination,
    a housing having a first, lower portion and a second, upper portion attached directly to said first, lower portion, said first and second portions defining a hollow interior,
    an inlet fitting in said first lower, portion, said inlet fitting adapted to receive air laden with a volatized lubricant from said motor vehicle components,
    an outlet fitting in said second, upper portion, said outlet fitting including a hollow cylindrical member providing communication with said hollow interior and a cap, said cap having a solid top and a passageway surrounding said cylindrical member, communicating with said hollow interior through said cylindrical member and extending to an ambient atmosphere below said solid top, and
    filter media disposed in said hollow interior for absorbing such volatized lubricant.

2. The apparatus of claim 1 wherein said housing is spherical and said first, lower portion and said second, upper portion are hemispherical.

3. The apparatus of claim 1 wherein said lower portion includes an upper edge and said upper portion includes a lower edge and further including a projecting lip adjacent one of said edges and a complementary groove adjacent another of said edges.

4. The apparatus of claim 1 wherein said filter media includes activated charcoal.

5. The apparatus of claim 1 wherein said filter media includes filtration fabric.

6. The apparatus of claim 1 wherein said inlet fitting is a barbed fitting and further including a hose attached to said inlet fitting.

7. A filter assembly for trapping volatized fluid from a motor vehicle powertrain component comprising, in combination,
- a container having a first section and a second section directly secured to said first section, said first and second sections defining a hollow interior,
- an inlet in said first section, said inlet adapted to receive air laden with a volatized lubricant from said motor vehicle powertrain component,
- an outlet in said second section, said outlet including a hollow cylindrical member providing communication with said hollow interior and said cap, said a cap having a solid top and an annular passageway surrounding said cylindrical member, communicating with said hollow interior through said cylindrical member and extending and opening below said solid top, and
- filter media disposed in said hollow interior for absorbing such volatized fluid.

8. The filter assembly of claim 7 wherein said housing is spherical and said first section and said second section are hemispherical.

9. The filter assembly of claim 7 wherein said first section includes a first edge and said second section includes a second edge and further including a projecting lip adjacent one of said edges and a complementary groove adjacent another of said edges.

10. The filter assembly of claim 7 wherein said filter media includes activated charcoal.

11. The filter assembly of claim 7 wherein said filter media includes filtration fabric.

12. A filter assembly for retaining volatized lubricant from a motor vehicle powertrain component comprising, in combination,
- a container having a first hemispherical section and a second hemispherical section directly secured to said first section, said first and second sections each defining substantially one half of a hollow interior,
- an inlet fitting in said first section, said inlet fitting adapted to receive a fluid conduit communicating with an interior of such powertrain component,
- an outlet in said second section, said outlet including a cylindrical member defining an outlet passageway and a cap having a solid, water deflecting top and an annular passageway communicating with said outlet passageway, extending below said solid top and providing communication between said hollow interior and an exterior of said housing, and
- filter media disposed in said hollow interior for retaining said volatized lubricant.

13. The filter assembly of claim 12 wherein said first hemispherical section is a lower section and said second hemispherical section is an upper section.

14. The filter assembly of claim 12 wherein said filter media includes activated charcoal.

15. The filter assembly of claim 12 wherein said filter media includes filtration fabric.

16. The filter assembly of claim 12 wherein said filter media includes filtration fabric impregnated with activated charcoal.

17. The filter assembly of claim 12 wherein said first hemispherical section includes a first edge and said second hemispherical section includes a second edge and further including a projecting lip adjacent one of said edges and a complementary groove adjacent another of said edges.

* * * * *